United States Patent [19]

Eilingsfeld et al.

[11] 3,915,977
[45] Oct. 28, 1975

[54] PRODUCTION OF AMINOBENZONITRILES VIA PHOSPHINE IMINES

[75] Inventors: Heinz Eilingsfeld, Frankenthal; Karl-Heinz Bantel, Ludwigshafen, both of Germany

[73] Assignee: Badische Anilin- & Soda-Fabrik Aktiengesellschaft, Ludwigshafen (Rhine), Germany

[22] Filed: Jan. 24, 1973

[21] Appl. No.: 326,306

[52] U.S. Cl.......... 260/302 R; 260/302 D; 260/304; 260/307 G; 260/465 D; 260/465 E
[51] Int. Cl.²................................. C07D 277/30
[58] Field of Search............ 260/302 R, 302 D, 304, 260/307 G, 465 D, 465 E

[56] References Cited
OTHER PUBLICATIONS

Grayson et al. (eds.), Topics in Phosphorus Chemistry, Vol. 4, p. 414, Interscience, N.Y., 1967.

Wagner et al., Synthetic Organic Chemistry, John Wiley & Sons, N.Y., pp. 591–594.

Primary Examiner—Richard J. Gallagher
Attorney, Agent, or Firm—Johnston, Keil, Thompson & Shurtleff

[57] ABSTRACT

Production of aminobenzonitrile derivatives by exchange of halogen for cyano in phosphine imine derivatives of the formula:

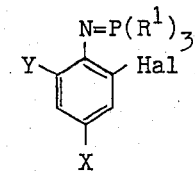

Aminobenzonitriles are valuable intermediates, particularly in the manufacture of dyes.

4 Claims, No Drawings

PRODUCTION OF AMINOBENZONITRILES VIA PHOSPHINE IMINES

The invention relates to a process for the production of aminobenzonitriles of the general formula (I):

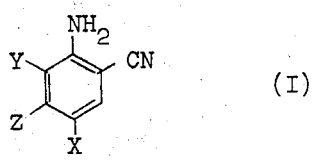

in which
X is hydrogen, chloro, bromo, nitro, cyano, methylsulfonyl, ethylsulfonyl, carbalkoxy, unsubstituted or substituted carbamoyl or unsubstituted or substituted sulfamoyl;
Y is hydrogen, chloro, bromo, nitro, cyano, methylsulfonyl, ethylsulfonyl, carbalkoxy, unsubstituted or substituted carbamoyl, unsubstituted or substituted sulfamoyl, methyl, methoxy or one of the radicals:

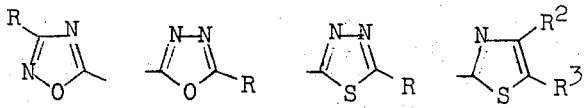

Z is hydrogen or, together with Y, —CH=N—S—;
R is alkyl of one to four carbon atoms, phenyl or phenyl bearing chloro, bromo, methyl, methoxy or ethoxy as a substituent;
$R^2$ is methyl, ethyl, phenyl or phenyl bearing chloro, bromo or methyl as a substituent;
$R^3$ is hydrogen, methyl or (when Y is methyl) carbalkoxy of 2 to 5 carbon atoms; or
$R^2$ and $R^3$ together with the carbon atoms connecting them a fused benzene ring which may bear methoxy, ethoxy, chloro or methyl as a substituent
which comprises exchanging the halogen in a compound of the formula (II):

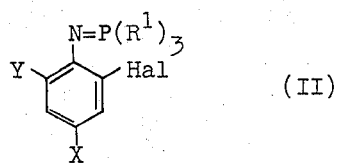

in which
Hal is chloro or bromo; and
$R^1$ is unsubstituted or substituted phenyl and X and Y have the meanings given above for cyano in the presence of a solvent with a metal cyanide, preferably cuprous cyanide or a compound which forms cuprous cyanide and splitting the reaction product into an aminobenzonitrile and a phosphine oxide.

Examples of carbalkoxy, unsubstituted or substituted carbamoyl and unsubstituted or substituted sulfamoyl groups for X and Y are: $COOCH_3$, $COOC_2H_5$, $COOC_4H_9$, $COOCH_2CH_2OCH_3$, $COOCH_2CH_2OC_4H_9$, $COO(CH_2CH_2O)CH_3$, $CONH_2$, $CONHCH_3$, $CONHC_4H_9$, $CONHCH_2CH_2OH$, $CON(CH_3)_2$, $CON(C_4H_9)_2$,

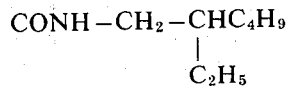

$SO_2NH_2$, $SO_2NHCH_3$, $SO_2NHC_2H_5$, $SO_2NHC_4H_9$, $SO_2N(CH_3)_2$ or $SO_2N(C_4H_9)_2$.

Examples of alkyl radicals R are methyl, ethyl, propyl and butyl; examples of radicals $R^1$ are chlorophenyl, methylphenyl, methoxyphenyl and preferably phenyl.

In the case of compounds of the formula (II) having a second halogen substituent, preferably in the ortho-position to the imino group, a stagewise exchange is possible as well as the exchange of both halogen substituents for cyanogen.

Polar aprotic solvents such as dimethylformamide, N-methylpyrrolidone, formamide, dimethylacetamide, pyridine, quinoline, acetonitrile, benzonitrile, phosphoric tris-dimethylamide and dimethylsulfoxide are particularly suitable as solvents for the exchange reaction.

Preferred solvents are dimethylformamide and N-methylpyrrolidone. Suitable metal cyanides include cuprous cyanide, silver cyanide, lead cyanide, potassium hexacyanoferrate (II), calcium hexacyanoferrate(II), copper hexacyanoferrate(II) and zinc cyanide. Of these cuprous cyanide is preferred because of its outstanding reactivity. It may be reacted as such or may be formed in situ in the reaction medium, for example by adding an alkali metal cyanide and a suitable cupric salt such as cupric sulfate or cupric acetate to the reaction medium. The reaction temperature may be varied within wide limits in the exchange reaction. It depends on the type of solvent and particularly on the constitution of the phosphine imine (II). The temperature is generally in the range from 100° to 220°C, preferably from 130° to 180°C.

The reaction may be carried out by dissolving or suspending the phosphine imine (II) with the metal cyanide, preferably cuprous cyanide or compounds forming cuprous cyanide, and heating the whole to elevated temperature. The course of the reaction may be monitored by paper or thin layer chromatography or by infrared spectroscopy. After the reaction is over, the reaction product may for example be precipitated with water.

Since the reaction products which, after the exchange, have the formula (III):

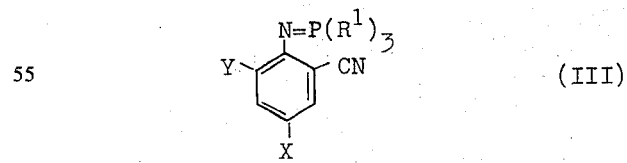

are however preferably split in acid medium it is not necessary to separate the excess of metal cyanide which is insoluble in the mixture of water and solvent because during the splitting it is converted into a water-soluble copper salt.

Splitting of the phosphine imine of the formula (III) is conveniently carried out in acid aqueous medium, for example in from 5 to 15% hydrochloric acid, sulfuric acid or another mineral acid. Hydrolysis conditions are chosen so that the cyano group is not hydrolyzed.

The new process is particularly suitable for the production of aminobenzonitriles of the formula (Ia):

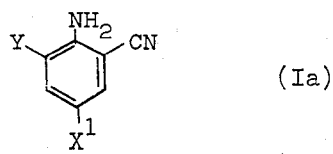

(Ia)

in which

X¹ is nitro or cyano and

Y has the meanings specified in formula (I).

Hydrogen, chloro, bromo, nitro, cyano and also a heterocyclic radical are preferred as radical Y.

The following Examples illustrate the invention. Unless otherwise stated parts and percentages in the following Examples are by weight and the temperatures are given in degrees Celsius.

EXAMPLE 1

95 parts of triphenyl-phosphine-2-bromo-4-nitrophenylimine-1 and 21 parts of cuprous cyanide are dissolved in 1000 parts of N-methylpyrrolidone and heated for 6 hours at 140°. After cooling the mixture is poured onto water and suction filtered. The triphenyl-phosphine-2-cyano-4-nitrophenylimine-1 thus obtained is stirred in 500 parts of 7% aqueous hydrochloric acid for 2 hours at 90°. The hydrochloric acid is then decanted from the crude mixture and the residue is stirred at room temperature with 250 parts of methanol. 30.8 parts of 2-amino-5-nitrobenzonitrile of the melting point 198° to 203° is obtained as a sparingly soluble residue. The product is identical with an authentic sample (mixed melting point, infrared comparison). 52 parts of triphenyl phosphine oxide (TPPO) may be recovered from the solution in methanol.

Instead of in N-methylpyrrolidone the reaction may be carried out in 1000 parts of dimethylformamide at a temperature of 130°.

Triphenyl phosphine phenylimines are accessible by reaction of triphenyl phosphine dibromide or dichloride with a primary aromatic amine in the presence of 2 moles of base, for example triethylamine.

EXAMPLE 2

47.7 parts of triphenyl phosphine-2-bromo-4-nitrophenylimine-1 is heated at 160° for 5 hours with 30 parts of cupric acetate monohydrate, 9.8 parts of potassium cyanide and 400 parts of N-methylpyrrolidone. After cooling the mixture is poured onto water and suction filtered. Triphenyl phosphine-2-cyano-4-nitrophenylimine-1 thus obtained is stirred into 250 parts of 7% aqueous hydrochloric acid for 2 hours at 90°. The hydrochloric acid is decanted off from the crude reaction mixture and the residue is stirred at room temperature with 130 parts of methanol. 14.2 parts of 2-amino-5-nitrobenzonitrile of the melting point 196° to 202° is obtained as a sparingly soluble residue. The product is identical with an authentic sample (see Example 1). 24.8 parts of TPPO may be recovered from the methanol solution.

EXAMPLE 3

51.2 parts of triphenyl phosphine-2-bromo-4-nitro-6-chlorophenylimine-1 is stirred with 10.8 parts of cuprous cyanide and 500 parts of N-methylpyrrolidone for 6 hours at 170°. After cooling the mixture is poured onto water, suction filtered and the triphenyl phosphine-2-cyano-4-nitro-6-chlorophenylimine-1 obtained in this way is stirred with 500 parts of 10% aqueous hydrochloric acid for 3 hours at 90°. The reaction product is suction filtered and stirred with 200 parts of methanol at room temperature. 17.9 parts of crude 2-amino-3-chloro-5-nitrobenzonitrile of the melting point 182° to 184° is obtained as a sparingly soluble residue. The product exhibits a sharp nitrile band in the infrared spectrum; analysis gives 0% of bromine and 16.7% of chlorine (calculated 18.0%).

When 26.9 parts of cuprous cyanide is used and heating is for 10 hours at 190° exchange of both halogen atoms takes place and after analogous working up 16.6 parts of crude 2,6-dicyano-p-nitraniline of the melting point 280° to 290° is obtained. This product is identical with an authentic sample (mixed melting point; infrared comparison).

EXAMPLE 4

107 parts of triphenyl phosphine-2,6-dibromo-4-nitrophenylimine-1 is stirred with 21 parts of cuprous cyanide and 1000 parts of N-methylpyrrolidone for 6 hours at 170°. After cooling the mixture is poured onto water, suction filtered and the triphenyl phosphine-2,6-dicyano-4-nitrophenylimine-1 is stirred with 500 parts of 10% aqueous hydrochloric acid for 2 hours at 90°. The reaction product is suction filtered and stirred with 600 parts of ethanol. 33.7 parts of crude 2,6-dicyano-p-nitraniline of the melting point 285° to 293° is obtained as a sparingly soluble residue. It is identical with an authentic sample (mixed melting point, infrared comparison). 51 parts of TPPO may be recovered from the methanol solution.

EXAMPLE 5

26.1 parts of triphenyl phosphine-2,4-dinitro-6-bromophenylimine-1 is stirred with 5.4 parts of cuprous cyanide and 250 parts of N-methylpyrrolidone for 5 hours at 150°. After cooling the mixture is poured onto water, the precipitate is suction filtered and the triphenyl phosphine-2,4-dinitro-6-cyanophenylimine-1 obtained is stirred with 200 parts of a 10% aqueous hydrochloric acid at 90°. The reaction product is then suction filtered and stirred with 150 parts of methanol. 9.5 parts of 2-amino-3,5-dinitrobenzonitrile of the melting point 228° to 235° is obtained as a sparingly soluble residue. The product is identical with an authentic sample (mixed melting point, infrared comparison). 10.3 parts of TPPO may be recovered from the methanol extract.

EXAMPLE 6

26.6 parts of triphenyl phosphine-2,4-dibromo-6-cyanophenylimine-1 is stirred with 300 parts of N-methylpyrrolidone and 11.7 parts of cuprous cyanide for 6 hours at 170°. After cooling the mixture is poured onto water, suction filtered from precipitate and the triphenyl phosphine-2,6-dicyano-4-bromophenylimine-1 is stirred for 3 hours at 90° with 300 parts of a 10% aqueous hydrochloric acid. The reaction product is then suction filtered and stirred with 200 parts of benzene. 9 parts of 2,6-dicyano-4-bromoaniline is obtained as a sparingly soluble residue; melting point 223° to 229°. Determination of bromine gives a value of 36.5% (calculated 36.0%). 10.5 parts of TPPO can be recovered from the benzene solution.

EXAMPLE 7

130 parts of triphenyl phosphine-2-bromo-4-nitro-6-[5'-(2'-m-methoxyphenyloxdiazolyl-1',3',4')]-phenylimine-1 is stirred with 1000 parts of N-methylpyrrolidone and 20 parts of cuprous cyanide for 6 hours at 170°. After cooling the mixture is poured onto water, suction filtered and the triphenyl phosphine-2-cyano-4-nitro-6-[5'-(2'-m-methoxyphenyloxdiazolyl-1',3',4',)]-phenylimine-1 thus obtained is stirred with 1500 parts of 10% aqueous hydrochloric acid for 3 hours at 50°. The reaction product is suction filtered and stirred with 350 parts of benzene. The sparingly soluble fraction consists of 52 parts of crude 2-cyano-4-nitro-6-[5'-(2'-m-methoxyphenyloxdiazolyl-1', 3',4',-)]-1-aminobenzene of the melting point 273° to 281°. The compound no longer contains any bromine and exhibits the characteristic nitrile band. 50 parts of TPPO may be recovered from the methanol solution.

EXAMPLE 8

67 parts of triphenyl phosphine-2-bromo-4-nitro-6[5'-(2'-p-chlorophenylthiadiazolyl-1',3',4',)]-phenylimine-1 is stirred with 1000 parts of N-methylpyrrolidone and 15 parts of cuprous cyanide for 6 hours at 170°. After the mixture has been cooled it is poured onto water, suction filtered and the triphenyl phosphine-2-cyano-4-nitro-6-[5'-(2'-p-chlorophenylthiadiazolyl-1',3',4',)]-phenylimine-1 thus obtained is stirred with 500 parts of 10% aqueous hydrochloric acid for 3 hours at 90°. The reaction product is suction filtered and stirred with 200 parts of methanol. The fraction sparingly soluble in methanol consists of 24 parts of 2-cyano-4-nitro-6-[5'-(2'-p-chlorophenylthiadiazolyl-1',3',4',)]-1-aminobenzene of the melting point 325° to 336°. The product exhibits the characteristic nitrile bands and no longer contains bromine. 22 parts of TPPO may be recovered from the methanol solution.

EXAMPLE 9

118 parts of triphenyl phosphine-2-bromo-4-nitro-6-[5'-(2'-m-methoxyphenylthiadiazolyl-1',3',4')]-phenylimine-1 is stirred with 1000 parts of N-methylpyrrolidone and 30 parts of cuprous cyanide for 6 hours at 170°. After the mixture has cooled it is poured onto water, suction filtered and the triphenyl phosphine-2-cyano-4-nitro-6-[5'-(2'-methoxyphenylthiadiazolyl-1',3',4')]-phenylimine-1 thus obtained is stirred with 800 parts of a 10% aqueous hydrochloric acid for 3 hours at 90°. The reaction product is suction filtered and stirred with 300 parts of methanol. The fraction which is sparingly soluble in methanol consists of 55 parts of 2-cyano-4-nitro-6[5'-(2'-m-methoxyphenylthiadiazolyl-1',3',4')]-1-aminobenzene which melts at 260° to 285°. It exhibits the characteristic nitrile band in the infrared spectrum and no longer contains bromine. 49 parts of TPPO may be recovered from the methanol solution.

The aminobenzonitriles which are characterized in the following Table by their substituents may be obtained by methods analogous to those described in the Examples:

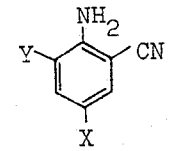

| Example | X | Y |
|---|---|---|
| 10 | NO$_2$ | 4'-methylthiazolyl-1',3' |
| 11 | NO$_2$ | 4'-ethylthiazolyl-1',3' |
| 12 | NO$_2$ | 4',5'-dimethyl-thiazolyl-1',3' |
| 13 | NO$_2$ | 4'-phenylthiazolyl-1',3' |
| 14 | NO$_2$ | 4'-benzthiazolyl-1',3' |
| 15 | NO$_2$ | 5'-methyl-oxdiazolyl-1',3',4' |
| 16 | NO$_2$ | 5'-ethyl-oxdiazolyl-1',3',4' |
| 17 | NO$_2$ | 5'-isopropyl-oxdiazolyl-1',3',4' |
| 18 | NO$_2$ | 5'-n-propyl-oxdiazolyl-1',3',4' |
| 19 | NO$_2$ | 5'-phenyl-oxdiazolyl-1',3',4' |
| 20 | NO$_2$ | 5'-o-methylphenyl-oxdiazolyl-1',3',4' |
| 21 | NO$_2$ | 5'-m-methylphenyl-oxdiazolyl-1',3',4' |
| 22 | NO$_2$ | 5'-p-methylphenyl-oxdiazolyl-1',3',4' |
| 23 | NO$_2$ | 5'-p-methoxyphenyl-oxdiazolyl-1',3',4' |
| 24 | NO$_2$ | 5'-o-chlorophenyl-oxidazolyl-1',3',4' |
| 25 | NO$_2$ | 5'-m-chlorophenyl-oxdiazolyl-1',3',4' |
| 26 | NO$_2$ | 5'-p-chlorophenyl-oxdiazolyl-1',3',4' |
| 27 | NO$_2$ | 5'-methyl-thiadiazolyl-1',3',4' |
| 28 | NO$_2$ | 5'-ethyl-thiadiazolyl-1',3',4' |
| 29 | NO$_2$ | 5'-isopropyl-thiadiazolyl-1',3',4' |
| 30 | NO$_2$ | 5'-n-propyl-thiadiazolyl-1',3',4' |
| 31 | NO$_2$ | 5'-phenyl-thiadiazolyl-1',3',4' |
| 32 | NO$_2$ | 5'-o-methylphenyl-thiadiazolyl-1',3',4' |
| 33 | NO$_2$ | 5'-m-methylphenyl-thiadiazolyl-1',3',4' |
| 34 | NO$_2$ | 5'-p-methylphenyl-thiadiazolyl-1',3',4' |
| 35 | NO$_2$ | 5'-o-methoxyphenyl-thiadiazolyl-1',3',4' |
| 36 | NO$_2$ | 5'-p-methoxyphenyl-thiadiazolyl-1',3',4' |
| 37 | NO$_2$ | 5'-o-chlorophenyl-thiadiazolyl-1',3',4' |
| 38 | NO$_2$ | 5'-m-chlorophenyl-thiadiazolyl-1',3',4' |
| 39 | NO$_2$ | 3'-methyl-oxdiazolyl-1',2',4' |
| 40 | NO$_2$ | 3'-o-toluyl-oxdiazolyl-1',2',4' |
| 41 | NO$_2$ | 3'-phenyl-oxdiazolyl-1',2',4' |
| 42 | NO$_2$ | —CH=N—S—(Y + Z) |
| 43 | NO$_2$ | COOCH$_3$ |
| 44 | NO$_2$ | COOC$_4$H$_9$ |
| 45 | NO$_2$ | COOCH$_2$CH$_2$OCH$_3$ |
| 46 | NO$_2$ | CONH$_2$ |
| 47 | NO$_2$ | CONHC$_4$H$_9$ |
| 48 | NO$_2$ | SO$_2$NHCH$_3$ |
| 49 | NO$_2$ | SO$_2$N(C$_2$H$_5$)$_2$ |
| 50 | NO$_2$ | CONHCH$_2$CH—C$_4$H$_9$<br>                                    C$_2$H$_5$ |

We claim:
1. A process for the production of an aminobenzonitrile of the formula (I):

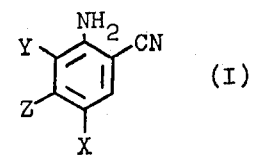

in which
X is hydrogen, chloro, bromo, nitro, cyano, methylsulfonyl, ethylsulfonyl, C$_1$- to C$_4$-alkoxycarbonyl, C$_1$- to C$_4$-alkoxyethoxycarbonyl, carbamoyl, sulfamoyl or N—C$_1$ to C$_8$-alkyl mono- or disubstituted carbamoyl or sulfamoyl;

Y is hydrogen, chloro, bromo, nitro, cyano, methylsulfonyl, ethylsulfonyl, $C_1$- to $C_4$-alkoxycarbonyl, $C_1$- to $C_4$-alkoxyethoxycarbonyl, carbamoyl, sulfamoyl, $N-C_1$ to $C_8$-alkyl mono- or disubstituted carbamoyl or sulfamoyl, methyl, methoxy or

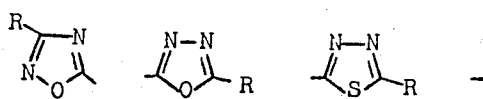

Z is hydrogen or, together with Y, —CH=N—S—;
R is alkyl of 1 to 4 carbon atoms, phenyl or phenyl bearing chloro, bromo, methyl, methoxy or ethoxy as a substituent;
$R^2$ is methyl, ethyl, phenyl or phenyl bearing chloro, bromo or methyl as a substituent;
$R^3$ is hydrogen, methyl or (when Y is methyl) carbalkoxy of 2 to 5 carbon atoms; or
$R^2$ and $R^3$ together with the carbon atoms connecting them are a fused benzene ring which may bear methoxy, ethoxy, chloro or methyl as a substituent
which comprises exchanging the halogen in a compound of the formula (II):

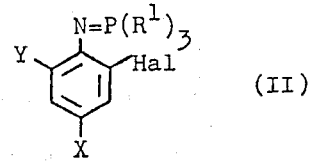

in which
Hal is chloro or bromo; and
$R^1$ is phenyl or phenyl substituted by chloro, methyl or methoxy and X and Y have the meanings given above for cyano by reaction of (II) with cuprous cyanide in the presence of a solvent and subsequently splitting the reaction product into an aminobenzonitrile and a phosphine oxide.

2. A process as claimed in claim 1 carried out at a temperature within the range from 100° to 220°C.

3. A process as claimed in claim 2 wherein the said range is from 130° to 180°C.

4. A process as claimed in claim 1 wherein the aminobenzonitrile produced has the formula (Ia):

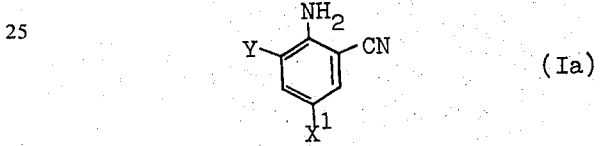

in which $X^1$ is nitro or cyano and Y has the meanings given in claim 1.

* * * * *